United States Patent
Willerton et al.

(10) Patent No.: US 9,598,110 B2
(45) Date of Patent: Mar. 21, 2017

(54) VEHICLE STORAGE COMPARTMENT ASSEMBLY

(71) Applicant: Nissan North America, Inc., Franklin, TN (US)

(72) Inventors: Joshua Willerton, West Bloomfield, MI (US); Aaron Andersen, Farmington, MI (US); Thomas Mally, Beverly Hills, MI (US); Nicholas Bee, Pleasant Ridge, MI (US); Brandon Sakofske, Sterling Heights, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/791,843

(22) Filed: Jul. 6, 2015

(65) Prior Publication Data

US 2017/0008566 A1   Jan. 12, 2017

(51) Int. Cl.
| | |
|---|---|
| *B60K 7/00* | (2006.01) |
| *B62D 21/15* | (2006.01) |
| *B60R 7/06* | (2006.01) |

(52) U.S. Cl.
CPC ............. *B62D 21/152* (2013.01); *B60R 7/06* (2013.01)

(58) Field of Classification Search
CPC ................................ B62D 21/152; B60R 7/06
USPC ..................................................... 296/187.05
See application file for complete search history.

(56) References Cited

U.S. PATENT DOCUMENTS

| | | | |
|---|---|---|---|
| 4,109,955 A | 8/1978 | Amann et al. | |
| 5,431,442 A * | 7/1995 | Tomita | B60R 21/045 180/90 |
| 7,311,327 B2 | 12/2007 | Yamazaki | |
| 7,735,866 B2 | 6/2010 | Clashman et al. | |
| 8,794,668 B2 * | 8/2014 | Monnier | B60R 21/045 280/752 |

FOREIGN PATENT DOCUMENTS

| | | |
|---|---|---|
| DE | 102006051948 B3 | 6/2008 |
| GB | 2515630 A | 12/2014 |

* cited by examiner

*Primary Examiner* — Joseph D Pape
*Assistant Examiner* — Dana Ivey
(74) *Attorney, Agent, or Firm* — Global IP Counselors, LLP

(57) ABSTRACT

A vehicle storage compartment assembly has a bottom wall, a first and second upright walls and a top wall. The first upright wall, the second upright wall and the top wall are each formed with a breakaway structure. A first section is defined on a first side and a second section is defined on a second side of the breakaway structure. The bottom wall extends from the first section to the second section in the absence of the breakaway structure. The first section, the second section and the bottom wall define a storage space. The breakaway structure is configured such that in response to one of the first section and the second section receiving an impacting force the breakaway structure breaks separating the first section from the second section along the first upright wall, the second upright wall and the top wall.

20 Claims, 8 Drawing Sheets

VEHICLE STORAGE COMPARTMENT ASSEMBLY

BACKGROUND

Field of the Invention

The present invention generally relates to a vehicle storage compartment assembly. More specifically, the present invention relates to dashboard mountable storage compartment assembly that is structured to collapse in response to an impact event.

Background Information

A body structure of a modern vehicle includes various impact absorbing features that are designed to intentionally deform in order to absorb a portion of the energy associated with an impact event.

SUMMARY

One object of the present disclosure is to provide a storage assembly, such as a glove box or other dashboard mountable storage structure with design features that cause the storage structure to deform and/or collapse in response to receiving force associated with an impact event.

In view of the state of the known technology, one aspect of the present disclosure is to provide a vehicle storage compartment assembly with a bottom wall, a first upright wall, a second upright wall and a top wall. The first upright wall, the second upright wall and the top wall are formed with a breakaway structure. A first section is defined on a first side of the breakaway structure and a second section is defined on a second side of the breakaway structure. The bottom wall extends from the first section to the second section in the absence of the breakaway structure. The first section, the second section and the bottom wall are shaped and dimensioned to define a storage space therein. The breakaway structure is configured such that in response to one of the first section and the second section receiving an impacting force the breakaway structure breaks separating the first section from the second section along at least a portion of the first upright wall, a portion of the second upright wall and a portion of the top wall.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
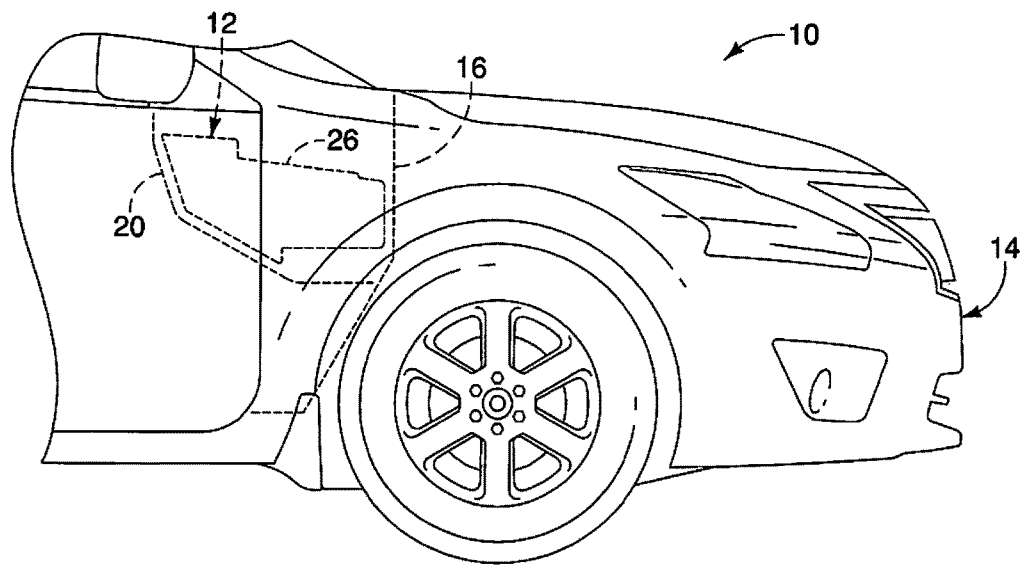
FIG. 1 is a side view of a front end of a vehicle that includes a storage compartment assembly in accordance with a first embodiment.

Referring initially to FIG. 1, a vehicle 10 that includes a storage compartment assembly 12 is illustrated in accordance with a first embodiment. The storage compartment assembly 12 includes features that allow the storage compartment assembly 12 to at least partially collapse and/or undergo limited deformation in response to an impact event.

The vehicle 10 is a conventional motorized vehicle that includes a front end 14, a dash wall 16, a passenger compartment 18 and an instrument panel 20 located within the passenger compartment 18.

The front end 14 of the vehicle includes a plurality of conventional features, such as a bumper assembly, fenders and an engine compartment whose descriptions are omitted for the sake of brevity.

The dash wall 16 is a conventional structural element of the vehicle 10 that separates an engine compartment of the vehicle 10 from the passenger compartment 18. Since dash walls are conventional structures within a vehicle, further description of the dash wall 16 is omitted for the sake of brevity.

The instrument panel 20 is installed within the passenger compartment 18 and is typically fixedly attached to at least the dash wall 16 in a conventional manner by, for example, mechanical fasteners above a floor F of the passenger compartment 18. The storage compartment assembly 12 is installed to the instrument panel 20, as is described in greater detail below.

Figure 2:
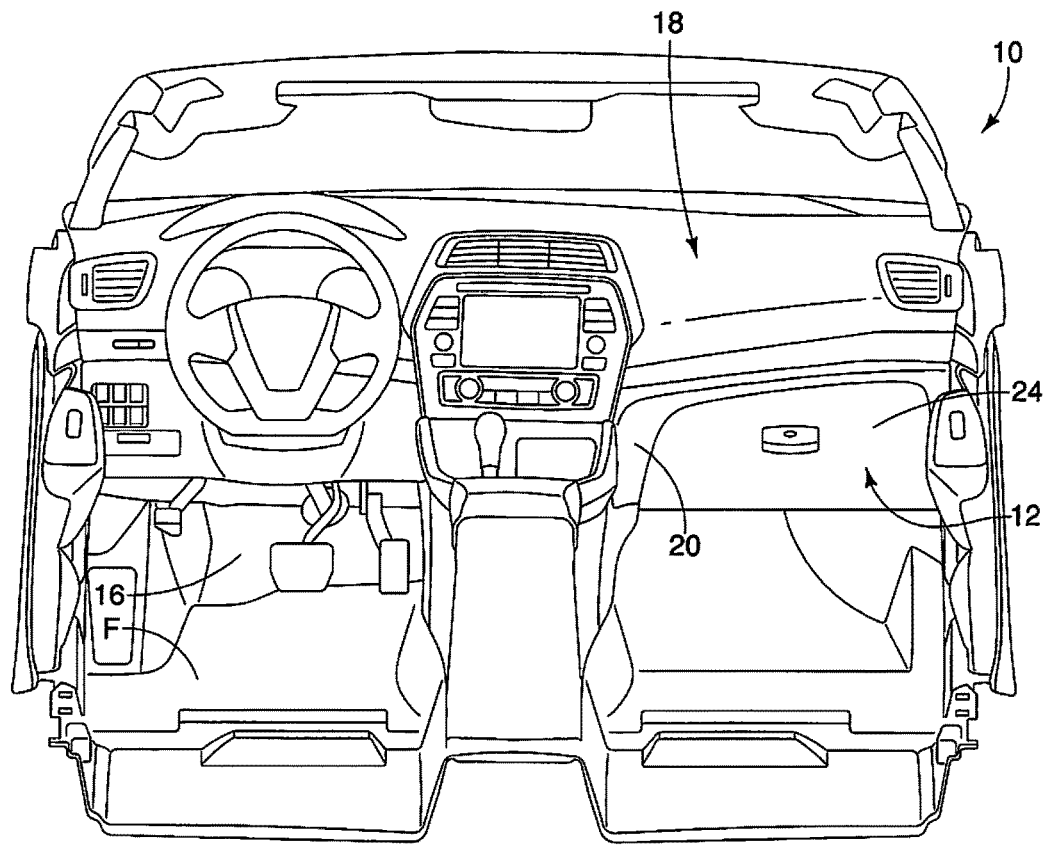
FIG. 2 is a perspective view of a passenger compartment of the vehicle depicted in FIG. 1 showing an instrument panel that includes the storage compartment in accordance with the first embodiment.

A description of the storage compartment assembly 12 is now provided with specific reference to FIGS. 3-12. The storage compartment assembly 12 basically includes a door 24 (FIG. 2 only) and a housing 26 shown in FIGS. 3 and 4. The housing 26 includes a plurality of conventional features such as a movement dampening mechanism 28. The movement dampening mechanism 28 is a conventional mechanism that restricts movement of the door 24 such that the door gradually opens. Since the movement dampening mechanism 28 is a conventional feature, further description is omitted for the sake of brevity.

The housing 26 has a bottom wall 30 (FIGS. 5-10), a first upright wall 32, a second upright wall 34, a top wall 36, an upright end wall 38 and an attachment flange 40. In the depicted embodiment, housing 26 is a molded element. More specifically, the bottom wall 30, the first upright wall 32, the second upright wall 34, the top wall 36, the upright end wall 38 and the attachment flange 40 are unitarily formed as a single, monolithic element devoid of seams or welding lines. The housing 26 also includes a plurality of curved edge portions 42, as described in greater detail below.

Figure 3:
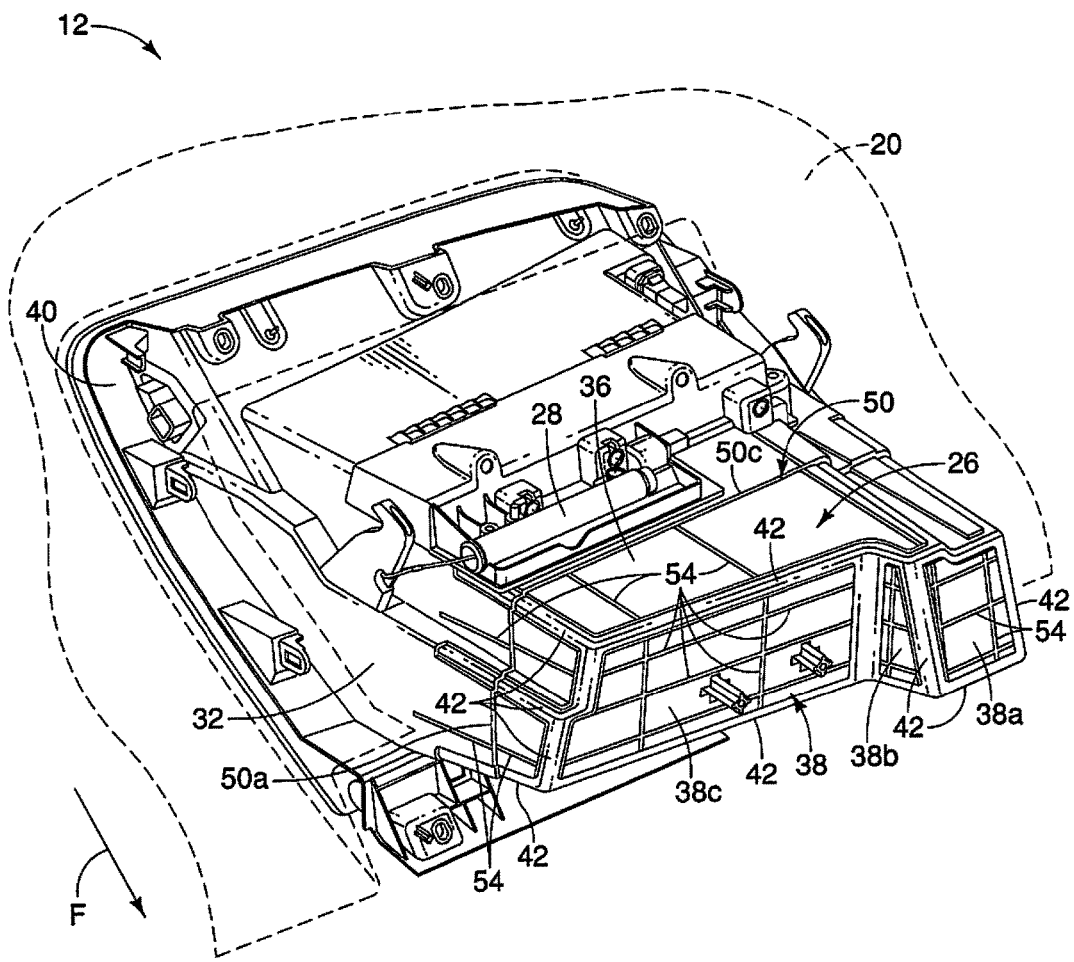
FIG. 3 is a first perspective view of the storage compartment assembly showing a first section, a second section and a breakaway structure defined between the first section and the second section in accordance with the first embodiment.
Figure 4:
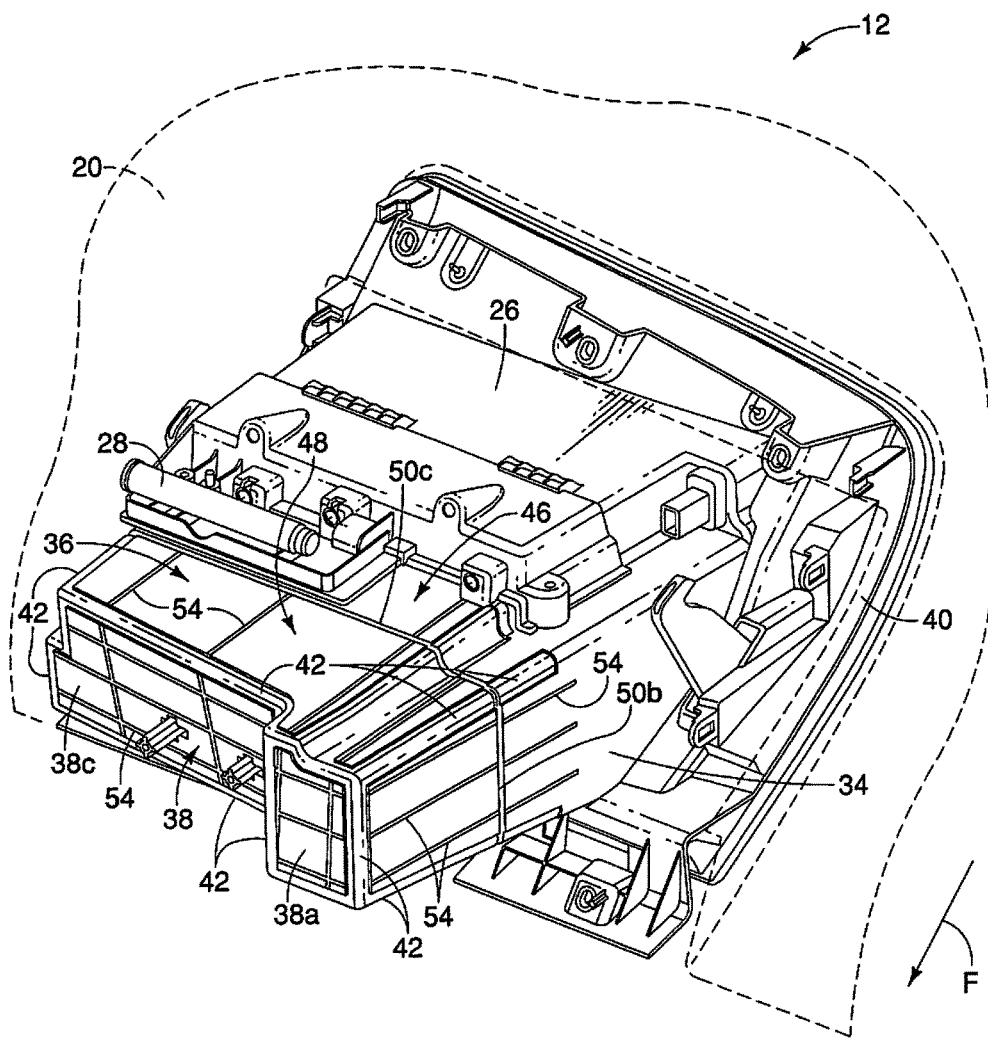
FIG. 4 is a second perspective view of the storage compartment assembly showing the first section, the second section and the breakaway structure defined between the first section and the second section in accordance with the first embodiment.

The housing 26 is also basically divided into two sections, a first section 46 and a second section 48 that are divided by a shear plane P that is also described in greater detail below. The first section 46 is larger than the second section 48. Further, the first section 46 is located rearward from the second section 48 when installed in the vehicle 10. In other words, the second section 48 is forward of the first section 46 relative to a forward direction F of the vehicle 10, as shown in FIGS. 3 and 4.

The bottom wall 30 has an overall flat or planar design with an upper surface 30a and a lower surface 30b. The bottom wall 30 extends uninterrupted along both the first section 46 and the second section 48 of the housing 26. Further, both the upper surface 30a and the lower surface 30b (FIGS. 7-10) are planar and smooth and do not include any part of a breakaway structure 50. The breakaway structure 50 is described in greater detail below. In other words, the bottom wall 30 is formed in the absence of the breakaway structure 50. The breakaway structure 50 defines the shear plane P, as is also described in greater detail below.

The first upright wall 32 (FIG. 3) can be planar or can include offset areas to accommodate movement restricting portions of the door 24 and the movement dampening mechanism 28 of the door 24. The first upright wall 32 includes a first part 50a of the breakaway structure 50, as is described in greater detail below, and a plurality of separation lines or V-grooves 54, also described in greater detail below.

The second upright wall 34 (FIG. 4) can be planar or can include offset areas to accommodate movement restricting portions of the door 24. The second upright wall 34 includes a second part 50b of the breakaway structure 50, as is described in greater detail below, and a plurality of the separation lines or V-grooves 54, also described in greater detail below.

The top wall 36 (FIGS. 3 and 4) can be planar or can include offset areas to accommodate the movement dampening mechanism 28 of the door 24 and conventional attachment projections. The top wall 36 includes a third part 50c of the breakaway structure 50, as is described in greater detail below, and a plurality of the separation lines or V-grooves 54, also described in greater detail below. The top wall 36 extends from the first upright wall 32 to the second upright wall 34 joining with each via one of the curved edge portions 42.

Figure 5:
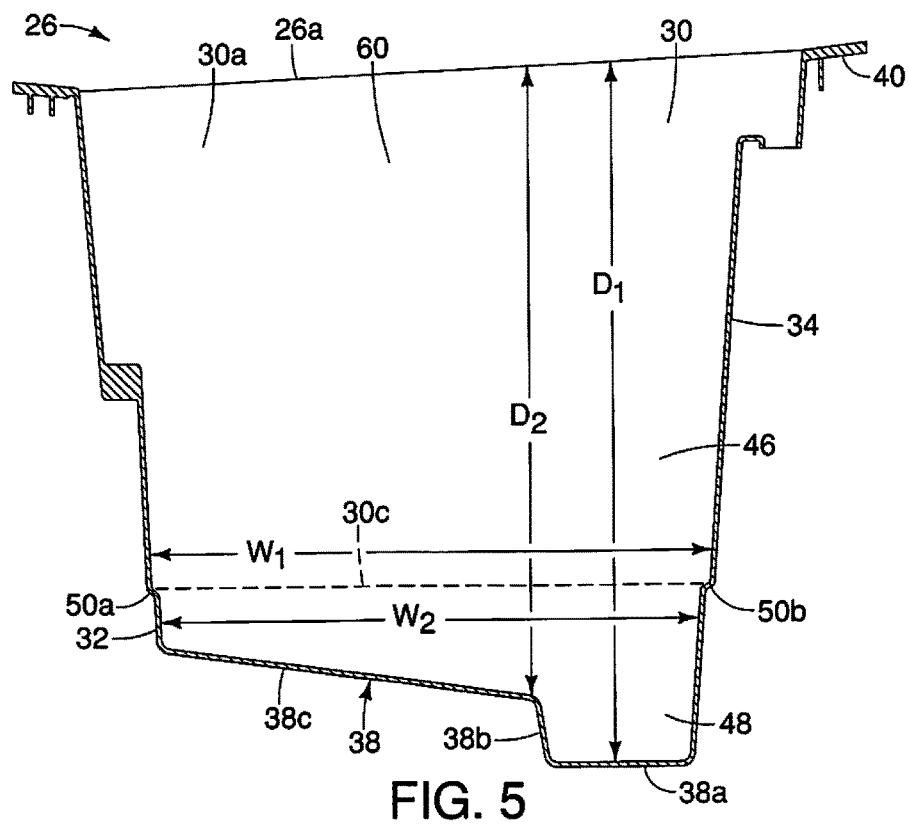
FIG. 5 is a top cross-sectional view of the storage compartment assembly in a normal use-state showing a first upright side wall, a second upright side wall and an upright end wall, the first upright side wall and the second upright side wall defining sections of the breakaway structure in accordance with the first embodiment.

The upright end wall 38 can be planar or, as shown in FIGS. 3-6, 9 and 11, can include a plurality of non-co-planar sections, such a first wall portion 38a, a second wall portion 38b and a third wall portion 38c. Each of the first wall portion 38a, the second wall portion 38b and the third wall portion 38c is planar but they are not co-planar with one another in the depicted embodiment. The bottom wall 30, the first upright wall 32, the second upright wall 34, the top wall 36 and the three portions 38a, 38b and 38c of the upright end wall 38 define a storage space 60. As shown in FIG. 5, as measured from an open end 26a of the housing 26 to the first wall portion 38a of the upright end wall 38, the storage space 60 has a maximum depth $D_1$. However, as measured from the open end 26a of the housing 26 to the third wall portion 38c of the upright end wall 38, the storage space 60 has a maximum depth $D_2$. In other words, the first and second wall portions 38a and 38b are dimensioned such that the area of the storage space 60 confined by them is deeper that the area confined by the third wall portion 38c.

The upright end wall 38 extends from the first upright wall 32 to the second upright wall 34 joining with each via others of the curved edge portions 42. Further, the upright end wall 38 extends from the bottom wall 30 to the top wall 36 joining with each via others of the curved edge portions 42.

Each section of the upright end wall 38 can include one or more of the plurality of the separation lines or V-grooves 54, also described in greater detail below.

The attachment flange 40 is unitarily formed with the housing 26 and extends around a rear end of the housing 26. The open end 26a of the housing 26 is at least partially surrounded by the attachment flange 40. The open end 26a is covered and concealed in FIG. 2 by the door 24. When the door is open, the open end 26a is exposed to the passenger compartment 18 allowing access to papers and other contents within the storage compartment assembly 12.

The attachment flange 40 includes projections and fastener openings such that the attachment flange 40 (and hence, the housing 26) can be secured to corresponding portions of the instrument panel 20 by mechanical fasteners, such as threaded screws, rivets, snap-fitting projections, or the like. Since attachment of a housing of a storage compartment assembly to an instrument panel via fasteners is a conventional structural arrangement, further description is omitted for the sake of brevity.

A description of the breakaway structure 50 is now described with continuing reference to FIGS. 3-12. The breakaway structure 50 the first part 50a (on first upright wall 32), the second part 50b (on second upright wall 34) and the third part 50c (on top wall 36). The first part 50a, the second part 50b and the third part 50c are aligned with one another defining the shear plane P (shown in FIGS. 8 and 10). In other words, the first part 50a and the second part 50b are parallel to one another with the third part 50c extending therebetween. Further, the first part 50*a* and the second part 50*b* extend downward from opposite ends of the third part 50*c*.

The first section 46 is defined on a rearward side of the breakaway structure 50 and the second section 46 of the housing 26 is defined on a forward side of the breakaway structure 50. As mentioned above, there is no breakaway structure present along the bottom wall 30.

Figure 8:
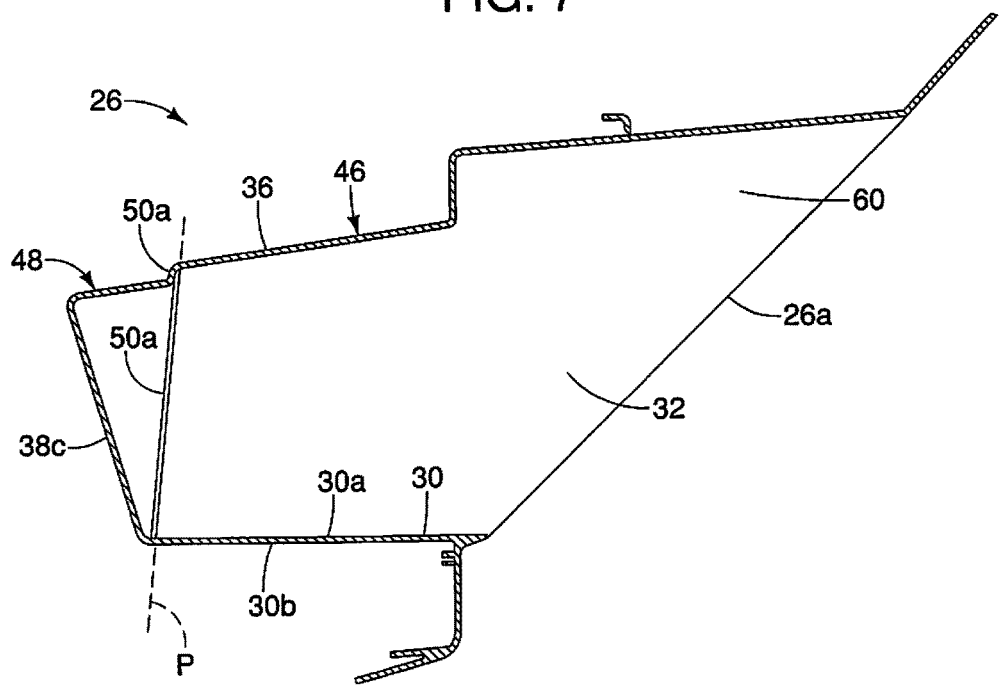
FIG. 8 is a side cross-sectional view of the storage compartment assembly taken along the same plane as the cross-section in FIG. 7 showing details of the first section, the second section and the breakaway structure in the normal use-state in accordance with the first embodiment.
Figure 9:
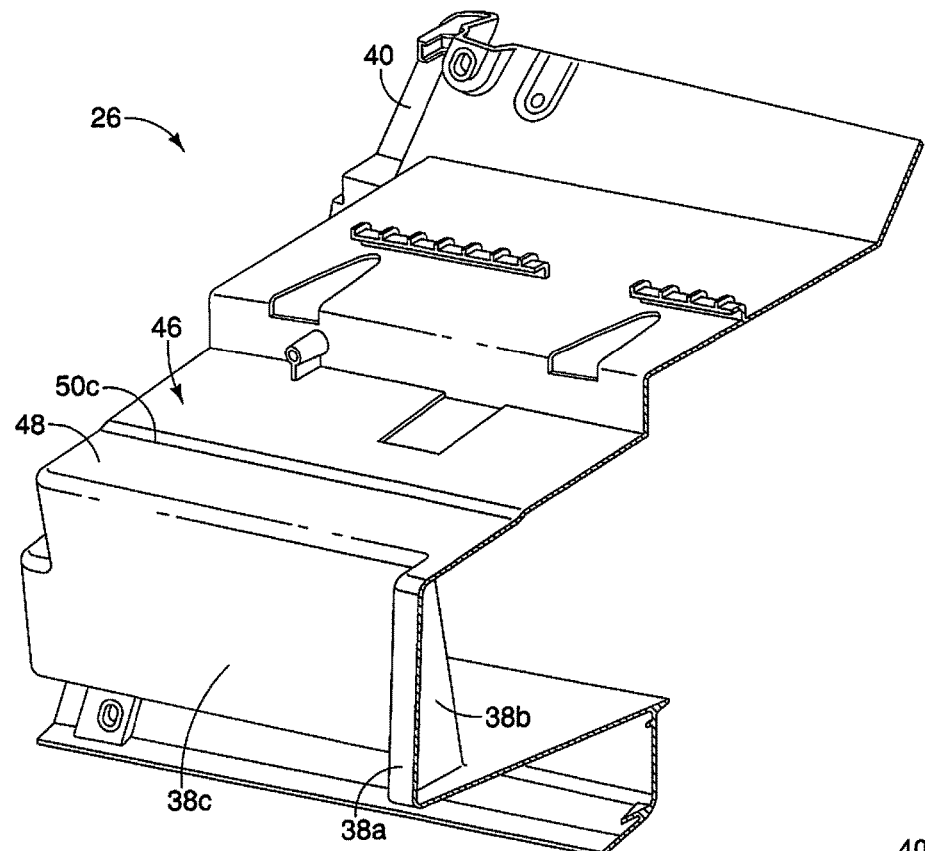
FIG. 9 is another perspective cross-sectional view of the storage compartment assembly showing further details of the first section, the second section and the breakaway structure in the normal use-state in accordance with the first embodiment.
Figure 10:
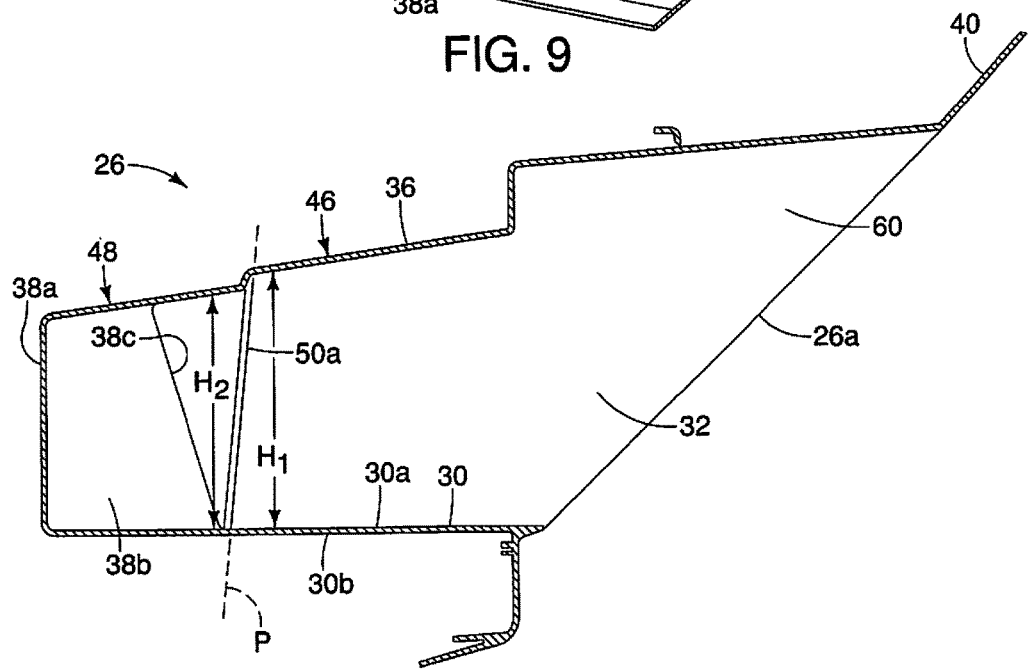
FIG. 10 is another side cross-sectional view of the storage compartment assembly taken along the same plane as the cross-section in FIG. 9 showing details of the first section, the second section and the breakaway structure in the normal use-state in accordance with the first embodiment.

The breakaway structure 50 has an S-shape as viewed in cross-section, as shown in FIGS. 5, 8 and 10. Specifically, as shown in FIG. 5, the first part 50*a* formed along first upright wall 32 and the second part 50*b* formed along second upright wall 34 curve inward moving from the first section 46 toward the second section 48 (from the rearward section to the forward section). Consequently, the first section 46 has a first width $W_1$ that is greater than a second width $W_2$ of the second section 48, as measured adjacent to and on either side of the breakaway structure 50, as shown in FIG. 5. As shown in FIG. 10, the first section 46 has a first height $H_1$ measured adjacent to the breakaway structure 50, and the second section 48 has a second height $H_2$ measured at the breakaway structure 50. The first height $H_1$ is larger than the second height $H_2$.

Figure 6:
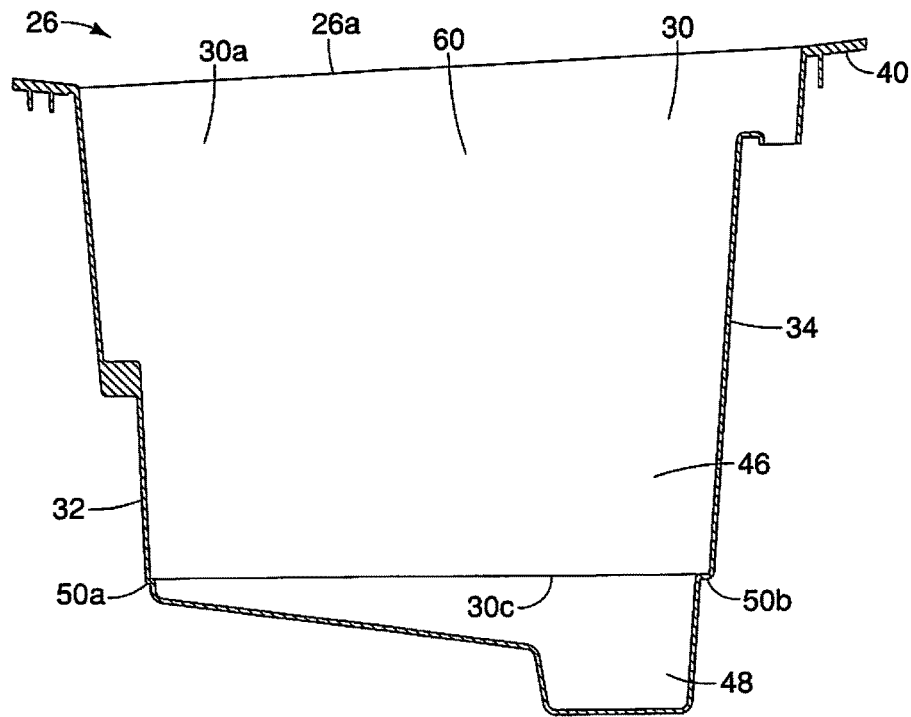
FIG. 6 is a top cross-sectional view of the storage compartment assembly similar to FIG. 5, with the storage compartment assembly in a collapsed state in response to an impact event in accordance with the first embodiment.
Figure 7:
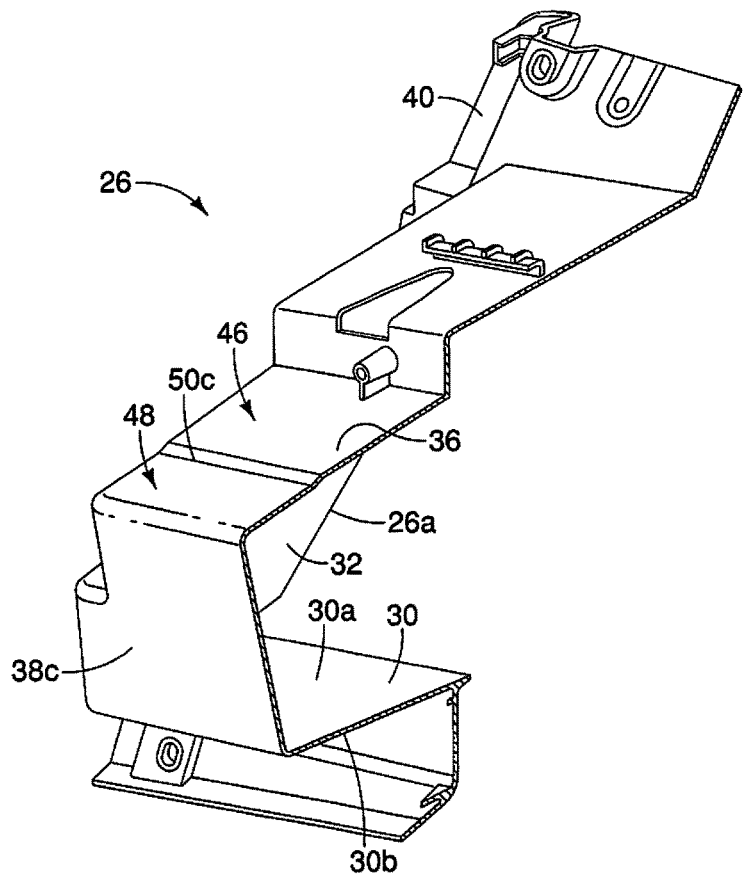
FIG. 7 is a perspective cross-sectional view of the storage compartment assembly showing details of the first section, the second section and the breakaway structure in the normal use-state in accordance with the first embodiment.
Figure 11:
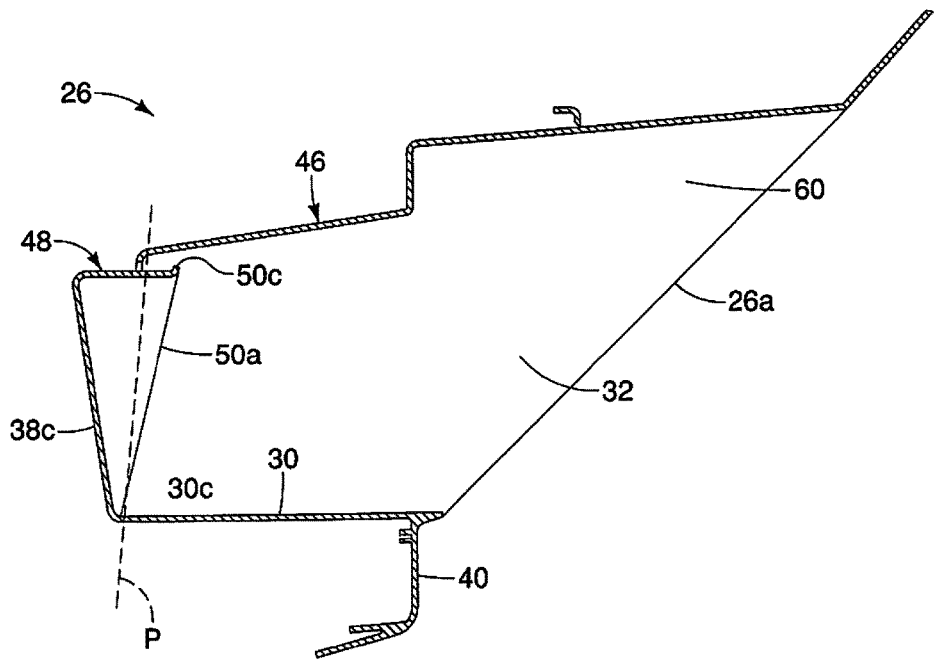
FIG. 11 is a side cross-sectional view of the storage compartment assembly similar to FIG. 8 showing details of the first section, the second section and the breakaway structure in the collapsed state in accordance with the first embodiment.
Figure 12:
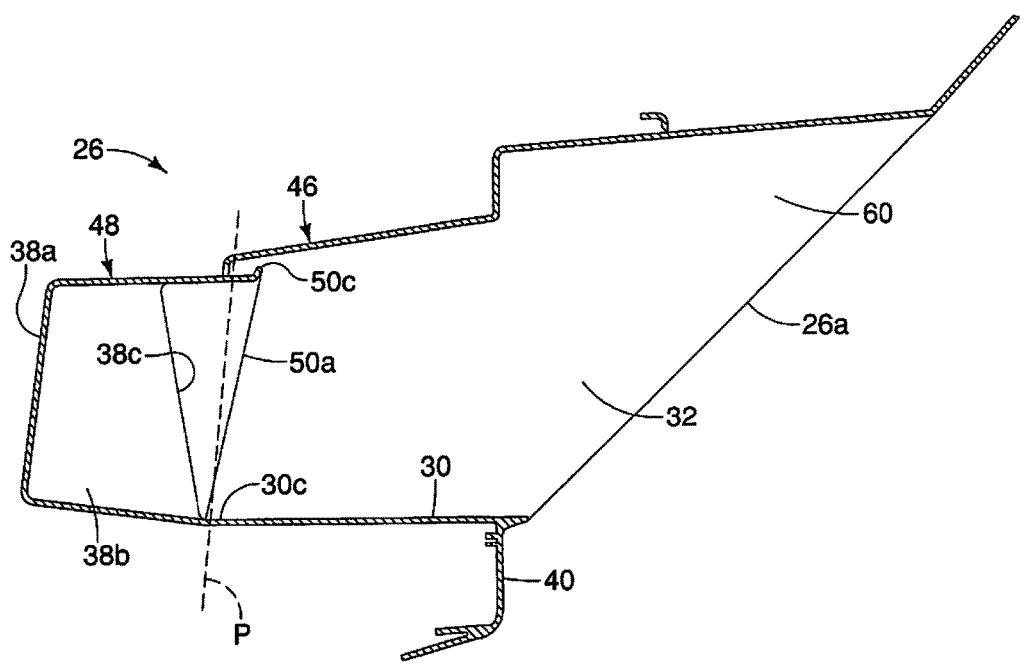
FIG. 12 is a side cross-sectional view of the storage compartment assembly similar to FIG. 10 showing details of the first section, the second section and the breakaway structure in the collapsed state in accordance with the first embodiment.

The breakaway structure 50 is configured such that in response to one of the first section 46 and the second section 48 receiving an impacting force, the breakaway structure 50 breaks separating the first section 46 from the second section 48 along at least a portion of the first upright wall 32, a portion of the second upright wall 34 and a portion of the top wall 36. As shown in FIGS. 6, 11 and 12, as the breakaway structure 50 separates the second portion 48 from the first section 46 along the first upright wall 32, the second upright wall 34 and the top wall 36, at least an upper part of the second portion 48 moves into the first section 46 in a telescoping manner. FIGS. 6, 11 and 12 show the housing 26 in what is hereinafter referred to as a collapsed state where the breakaway structure 50 has caused the second section 48 to separate from the first section 46 along the first upright wall 32, the second upright wall 34 and the top wall 36.

As shown in FIGS. 11 and 12, the bottom wall 30 flexes or bends along a bending line 30*c* with the housing 26 in the collapsed state. In the depiction in FIGS. 11 and 12, the upper end of the second section 48 has moved only a small amount. However, it should be understood from the drawings and the description herein that the second section 48 can undergo greater pivoting movement about the bending line 30*c* of the bottom wall 30 depending upon the level of force applied on the housing 26 during the impact event, thereby causing the bottom wall 30 to deform along the bending line 30*c*.

The bending line 30*c* is not a feature formed into the bottom wall 30 when the housing 26 is manufactured. Rather, the bending line 30*c* is a location where bending or deformation can occur in response to the impact event.

The impact event that can cause the housing 26 to move to the collapsed state can be any of a variety of events. For instance, the vehicle 10 can be impacted from the front, side or rear (not shown) causing structural features such as the dash wall 16 to deform. Deformation of the dash wall 16 can be such that the dash wall 16 contacts the housing 26. The housing 26 can receive sufficient force to cause it to break along the breakaway structure 50 as shown in FIGS. 6, 11 and 12. Since there is no breakaway structure present on the bottom wall 30, the bottom wall 30 acts as a spring biasing the second section 48 toward the in-use state shown in FIGS. 5, 8 and 10.

The breakaway structure 50 can be formed with a reduced thickness. In other words, the first part 50*a* along the first upright wall 32, the second part 50*b* along the second upright wall 34 and the third part 50*c* along the top wall 36 can have a thickness that is less than the thickness of the first upright wall 32, the second upright wall 34 and the top wall 36 at locations spaced apart from the breakaway structure 50. However, in the depicted embodiment, the breakaway structure 50 has no such thickness reduction. Rather, the geometry of breakaway structure 50 is such that in response to an impact event, the second section 48 breaks away from the first section 46 along the breakaway structure 50 leaving the bottom wall 30 intact and possibly bent along the bending line 30*c*.

Figure 13:
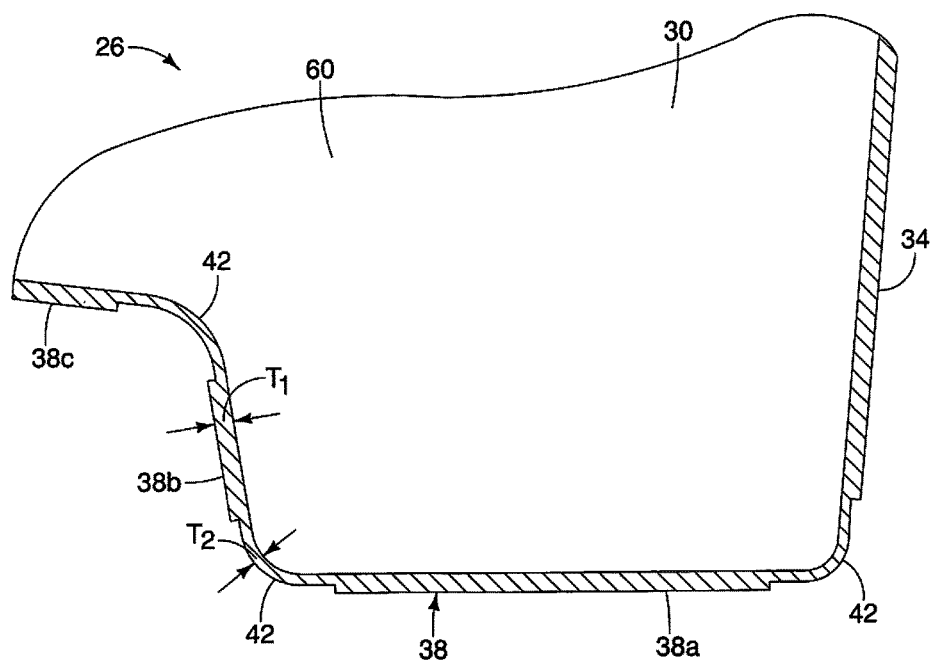
FIG. 13 is a top cross-sectional view of the storage compartment assembly showing details of curved corner sections that have reduced thicknesses in accordance with the first embodiment.

As shown in FIGS. 3, 4 and 13, the curved edge portions 42 are formed between adjacent ones of the first upright wall 32, the second upright wall 34, the top wall 36 and the upright end wall 38. Since each of the curved edge portions 42 has basically the same curvature and purpose, description of one of the curved edge portions 42 applies equally to all of them. FIG. 13 shows several of the curved edge portions 42. Specifically, curved edge portions 42 are shown in FIG. 13 between the second upright wall 34 and the first wall portion 38*a* of the upright end wall 38, between the first wall portion 38*a* of the upright end wall 38 and the second wall portion 38*b*, and between the second wall portion 38*b* and the third wall portion 38*c*. Each of the curved edge portions 42 has a reduced thickness. Specifically, the first upright wall portion 32, the second upright wall 34, the top wall portion 36 and the three portions of the upright end wall 38 all have a first thickness $T_1$, as shown in FIG. 13. Each of the curved edge portions 42 has a second thickness $T_2$ that is smaller than the first thickness $T_1$. In the depicted embodiment, the second thickness $T_2$ is 50% of the first thickness $T_1$.

The reduced thickness of the curved edge portions 42 provides addition energy absorbing features of the housing 26. For example, during an impact event as noted above, the second section 48 can at least partially separate from the first section 46 along the breakaway structure 50. The curved edge portions 42 can also break, separating the two adjacent wall portions from one another along the corresponding one of the curved edge portions 42.

An impact event can cause energy to be directed in any direction relative to the vehicle 10. A frontal impact event, a side impact event or a rear impact event can cause impacting energy to make its way to the housing 26. It is therefore possible for the housing 26 to be impacted in any of a variety of directions. Consequently, any of a combination of the curved edge portions 42 can receive impact energy and can break causing separation of the two adjacent wall portions.

Figure 14:
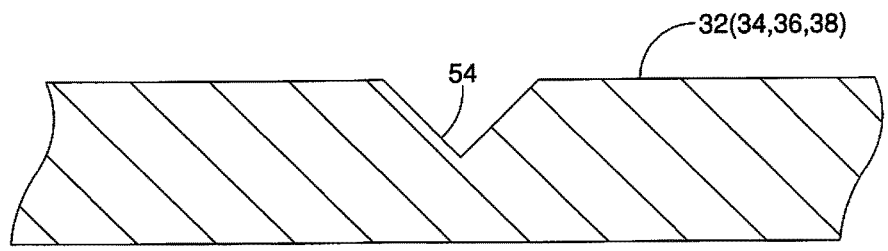
FIG. 14 is a cross-sectional view of one of the first upright wall, the second upright wall, the upright end wall and the top wall showing separation lines having a V-shape in cross-section in accordance with the first embodiment.

As shown in FIGS. 3, 4 and 14, the first upright wall 32, the second upright wall 34, the top wall 36 and the upright end wall 38 all include one or more of the separation lines or V-grooves 54. The V-grooves 54 provide the housing 26 with additional locations where areas of the housing 26 can separate from one another further absorbing impact energy. As shown in FIG. 14, each of the V-grooves 54 can reduce the overall thickness of the corresponding wall by up to 50%. The breakaway structure 50 defines the shear plane P. A majority of the V-grooves 54 (lines of separation) extend in directions that are transverse to the shear plane P.

In the depicted embodiment, the V-grooves 54 are formed along surfaces of the housing 26 that are hidden with the housing 26 installed within the instrument panel 20. In other words, the V-grooves 54 are not formed on surfaces that define the storage space 60. However, in an alternative embodiment, the V-grooves can be formed along surfaces that define the storage space 60.

The breakaway structure 50, the V-grooves 54 and the curved edge portions 42 together provide the housing 26 of the storage compartment assembly 12 with a variety of impact energy absorbing features that serve to limit possible movement of the housing 26 and the contents of the storage space 60 into the passenger compartment 18 as a result of an impact event. The breakaway structure 50 makes it possible for the second section 48 to at least partially move into the first section 46 of the housing 26 during an impact event. The V-grooves 54 and the curved edge portions 42 define lines of separation where adjacent areas of the housing 26 can break and/or separate from one another thereby absorbing impact energy and limiting the possibility of intrusion of the housing 26 and the contents of the storage space 60 into the passenger compartment 18.

The passenger compartment features of the vehicle 10, other than the housing 26, are conventional components that are well known in the art. Since these vehicle features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the storage compartment assembly. Accordingly, these terms, as utilized to describe the present invention should be interpreted relative to a vehicle equipped with the storage compartment assembly.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle storage compartment assembly comprising:
   a bottom wall;
   a first upright wall;
   a second upright wall; and
   a top wall,
   the first upright wall, the second upright wall and the top wall each being formed with a breakaway structure with a first section being defined on a first side of the breakaway structure and a second section being defined on a second side of the breakaway structure, the bottom wall extending from the first section to the second section in the absence of the breakaway structure, the first section, the second section and the bottom wall being shaped and dimensioned to define a storage space therein, the first section having a first height measured at the breakaway structure, and the second section having a second height measured at the breakaway structure, the first height being larger than the second height, and
   the breakaway structure being configured such that in response to receiving an impacting force to one of the first section and the second section, the breakaway structure breaks separating the first section from the second section along at least a portion of the first upright wall, a portion of the second upright wall and a portion of the top wall.

2. The vehicle storage compartment assembly according to claim 1, wherein
   the breakaway structure is configured such that in response to the one of the first section and the second section receiving the impacting force portions of the second section move into the storage space along respective adjacent portions of the first section causing deformation of the bottom wall.

3. The vehicle storage compartment assembly according to claim 1, wherein
   the breakaway structure has an S-shape as viewed in cross-section.

4. The vehicle storage compartment assembly according to claim 1, wherein
   the first section has a first width measured from the first wall to the second wall and the second section has a second width measured from the first wall to the second wall, the first width being greater than the first width, with the breakaway structure defining an offset portion bridging the first section and the second section.

5. The vehicle storage compartment assembly according to claim 4, wherein
   the first section includes an attachment flange that extends around at least a portion of the first section at a location spaced apart from the breakaway portion, the attachment flange being configured for attachment to an instrument panel within a vehicle passenger compartment.

6. The vehicle storage compartment assembly according to claim 1, wherein
the second section has an outer surface that includes a plurality of V-grooves that define lines of separation.

7. The vehicle storage compartment assembly according to claim 6, wherein
the breakaway structure defines a shear plane that extends through the top wall, the first side wall and the second side wall, the lines of separation extending in directions transverse to the shear plane.

8. The vehicle storage compartment assembly according to claim 6, wherein
the first section has an outer surface that includes a plurality of V-grooves that define lines of separation.

9. The vehicle storage compartment assembly according to claim 8, wherein
the plurality of V-grooves defined on the outer surface of the first section is aligned with the plurality of V-grooves defined on the outer surface of the second section.

10. The vehicle storage compartment assembly according to claim 1, wherein
the top wall and the first upright wall are fixed to one another by a first curved edge portion that curves downward from the top wall to the first upright wall, the top wall having a first thickness and the first curved edge portion having a second thickness that is less than the first thickness.

11. The vehicle storage compartment assembly according to claim 10, wherein
the top wall and the second upright wall are fixed to one another by a second curved edge portion that curves downward from the top wall to the first upright wall, the top wall having the first thickness and the second curved edge portion having the second thickness.

12. The vehicle storage compartment assembly according to claim 1, wherein
the first section includes an open end encircled by corresponding edges of the bottom wall, the first upright wall, the second upright wall and the top wall, and
the upright end wall has a first segment, a second segment and a third segment, the second segment extending from the first segment to the third segment, the first segment being spaced apart from the open end by a first distance as measured along the bottom wall and the third segment being spaced apart from the open end by a second distance that is greater than the first distance, as measured along the bottom wall.

13. The vehicle storage compartment assembly according to claim 1, wherein
the bottom wall, the first upright wall, the second upright wall and the top wall define a dashboard mountable glove box structure.

14. A vehicle storage compartment assembly comprising:
a bottom wall;
a first upright wall;
a second upright wall; and
a top wall,
the first upright wall, the second upright wall and the top wall each being formed with a breakaway structure with a first section being defined on a first side of the breakaway structure and a second section being defined on a second side of the breakaway structure, the bottom wall extending from the first section to the second section in the absence of the breakaway structure, the first section, the second section and the bottom wall being shaped and dimensioned to define a storage space therein, the breakaway structure including a first portion that extends along the first upright wall, a second portion that extends along the second upright wall and a third portion that extends along the top wall, the first portion, the second portion and the third portion of the breakaway structure being co-planar thereby defining a shear plane, and
the breakaway structure being configured such that in response to receiving an impacting force to one of the first section and the second section, the breakaway structure breaks separating the first section from the second section along at least a portion of the first upright wall, a portion of the second upright wall and a portion of the top wall.

15. The vehicle storage compartment assembly according to claim 14, wherein
the first section has a first width measured from the first wall to the second wall and the second section has a second width measured from the first wall to the second wall, the first width being greater than the first width, with the breakaway structure defining an offset portion bridging the first section and the second section.

16. The vehicle storage compartment assembly according to claim 14, wherein
the top wall and the upright end wall are fixed to one another by a curved edge portion that curves downward from the top wall to the upright end wall, the top wall having a first thickness and the curved edge portion having a second thickness that is less than the first thickness.

17. A vehicle storage compartment assembly comprising:
a bottom wall;
a first upright wall;
a second upright wall; and
a top wall,
the first upright wall, the second upright wall and the top wall each being formed with a breakaway structure with a first section being defined on a first side of the breakaway structure and a second section being defined on a second side of the breakaway structure, the bottom wall extending from the first section to the second section in the absence of the breakaway structure, the first section, the second section and the bottom wall being shaped and dimensioned to define a storage space therein, the second section including an upright end wall that intersects with the top wall, the first upright wall and the bottom wall, and
the breakaway structure being configured such that in response to receiving an impacting force to one of the first section and the second section, the breakaway structure breaks separating the first section from the second section along at least a portion of the first upright wall, a portion of the second upright wall and a portion of the top wall.

18. The vehicle storage compartment assembly according to claim 17, wherein
the top wall and the upright end wall are fixed to one another by a curved edge portion that curves downward from the top wall to the upright end wall, the top wall having a first thickness and the curved edge portion having a second thickness that is less than the first thickness.

19. The vehicle storage compartment assembly according to claim 17, wherein
the bottom wall and the upright end wall are fixed to one another by a curved edge portion that curves upward from the bottom wall to the upright end wall, the bottom wall having a first thickness and the curved edge portion having a second thickness that is less than the first thickness.

20. The vehicle storage compartment assembly according to claim 17, wherein
the first upright wall and the upright end wall are fixed to one another by a curved edge portion that curves from the first upright wall to the upright end wall, the first upright wall having a first thickness and the curved edge portion having a second thickness that is less than the first thickness.

\* \* \* \* \*